United States Patent
Rao et al.

(10) Patent No.: US 12,457,710 B2
(45) Date of Patent: Oct. 28, 2025

(54) HEAT DISSIPATION HOLDER

(71) Applicant: ASUSTEK COMPUTER INC., Taipei (TW)

(72) Inventors: Jhih-Wei Rao, Taipei (TW); Zih-Siang Huang, Taipei (TW); Hung-Chieh Wu, Taipei (TW); Liang-Jen Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 412 days.

(21) Appl. No.: 18/154,519

(22) Filed: Jan. 13, 2023

(65) Prior Publication Data

US 2024/0008227 A1   Jan. 4, 2024

(30) Foreign Application Priority Data

Jul. 4, 2022  (TW) .................................. 111124983

(51) Int. Cl.
*F25B 21/02* (2006.01)
*H05K 7/20* (2006.01)
*H04M 1/02* (2006.01)

(52) U.S. Cl.
CPC ........... *H05K 7/2039* (2013.01); *F25B 21/02* (2013.01); *H05K 7/20145* (2013.01); *H04M 1/0202* (2013.01)

(58) Field of Classification Search
CPC ...... F25B 21/02; F25B 21/04; H05K 7/20145
See application file for complete search history.

(56) References Cited

U.S. PATENT DOCUMENTS

| | | | | |
|---|---|---|---|---|
| 5,704,212 | A | * | 1/1998 | Erler ....................... F25B 21/04 |
| | | | | 361/679.48 |
| 2006/0185711 | A1 | * | 8/2006 | Bang ........................ F25B 21/02 |
| | | | | 136/230 |
| 2007/0101729 | A1 | * | 5/2007 | Aoki ..................... B60N 2/5657 |
| | | | | 62/3.61 |
| 2015/0017905 | A1 | | 1/2015 | Li et al. |
| 2018/0206365 | A1 | * | 7/2018 | Norton ............... H05K 7/20727 |

OTHER PUBLICATIONS

ASUS Discussion Forum "The Whistleblower brought color rendering figures of ROG Phone 6 and peripheral accessories" retrieved from: ePrice Mobile https://m.eprice.com.tw/mobile/talk/4543/5735067/1, published Jun. 28, 2022, 13 pages.

* cited by examiner

*Primary Examiner* — Brian M King
(74) *Attorney, Agent, or Firm* — Muncy, Geissler, Olds & Lowe, P.C.

(57) ABSTRACT

A heat dissipation holder applied to a handheld electronic device is provided. The heat dissipation holder includes a base, a cover, a heat dissipation module, and an air guiding structure. The base includes a first side and a second side that are opposite to each other and a front surface and a rear surface that are opposite to each other. The first side includes a first opening. The cover is combined onto the front surface to form an accommodating space with the base. The cover includes an air inlet region. The heat dissipation module is disposed in the accommodating space. The air guiding structure is disposed on the cover and extends to the first opening. The first opening, the air inlet region, and the air guiding structure form an airflow channel between the heat dissipation module and the cover.

10 Claims, 7 Drawing Sheets

HEAT DISSIPATION HOLDER

CROSS-REFERENCE TO RELATED APPLICATION

This application claims the priority benefit of Taiwan Application Serial No. 111124983, filed on Jul. 4, 2022. The entirety of the above-mentioned patent application is hereby incorporated by reference herein and made a part of the specification.

BACKGROUND OF THE INVENTION

Field of the Invention

The disclosure relates to a heat dissipation holder, and in particular, to a heat dissipation holder applied to assemble a handheld electronic device.

Description of the Related Art

As the performance of mobile phones is improved, the heat generated by the mobile phones during operation are increasing. The increase of heat generated by the mobile phones not only reduces the service lives of the mobile phones, but also affects the user experience.

SUMMARY OF THE INVENTION

The disclosure provides a heat dissipation holder applied to a handheld electronic device. The heat dissipation holder includes a base, a cover, a heat dissipation module, and an air guiding structure. The base includes a first side and a second side that are opposite to each other and a front surface and a rear surface that are opposite to each other. The first side includes a first opening. The cover is combined onto the front surface to form an accommodating space with the base, and a part of the cover biased toward the second side includes an air inlet region. The heat dissipation module is disposed in the accommodating space. The air guiding structure is disposed on the cover and extends to the first opening. The first opening, the air inlet region, and the air guiding structure form an airflow channel between the heat dissipation module and the cover.

Airflows are effectively guided by the air guiding structure, the first opening on the base, and the second opening on the cover provided in the disclosure to flow through the heat dissipation module for heat dissipation, and flow through the heating region on the rear surface of the handheld electronic device, to improve the efficiency of dissipating the heat of the handheld electronic device.

DETAILED DESCRIPTION OF THE EMBODIMENTS

The following will describe specific embodiments of the disclosure in more detail with reference to drawings. According to the following description and scope of patent application, advantages and characteristics of the disclosure will be clearer. It should be noted that, the drawings are all in a very simplified form and are not drawn to accurate scale, but are merely used for convenience and clarity of description of the embodiments of the disclosure.

Figure 1:
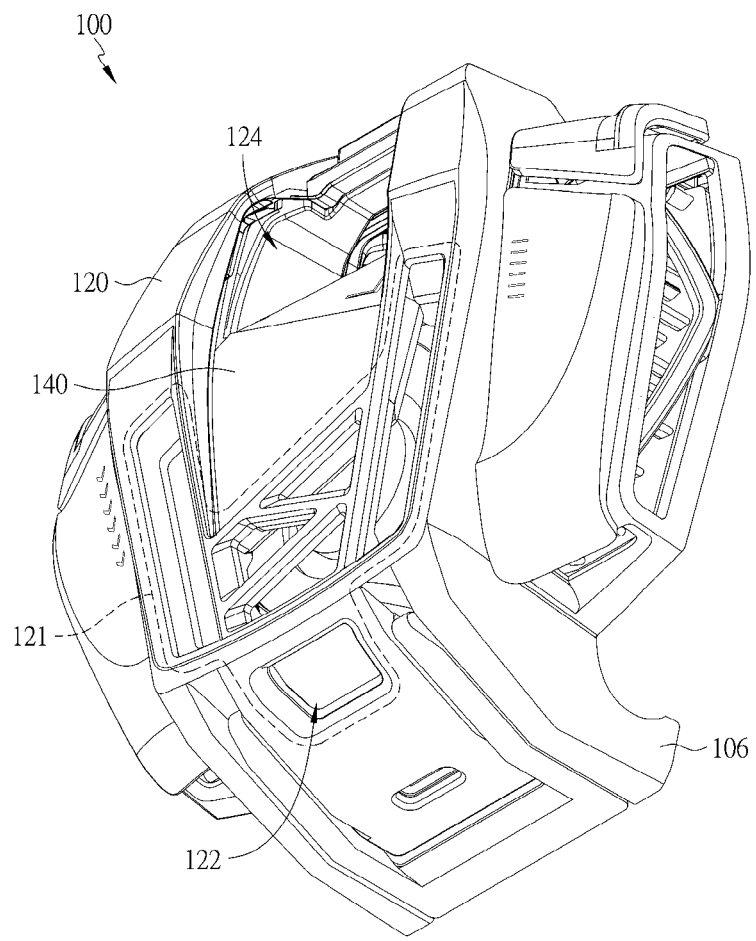
FIG. 1 is a schematic three-dimensional front view of a heat dissipation holder according to an embodiment of the disclosure.
Figure 2:
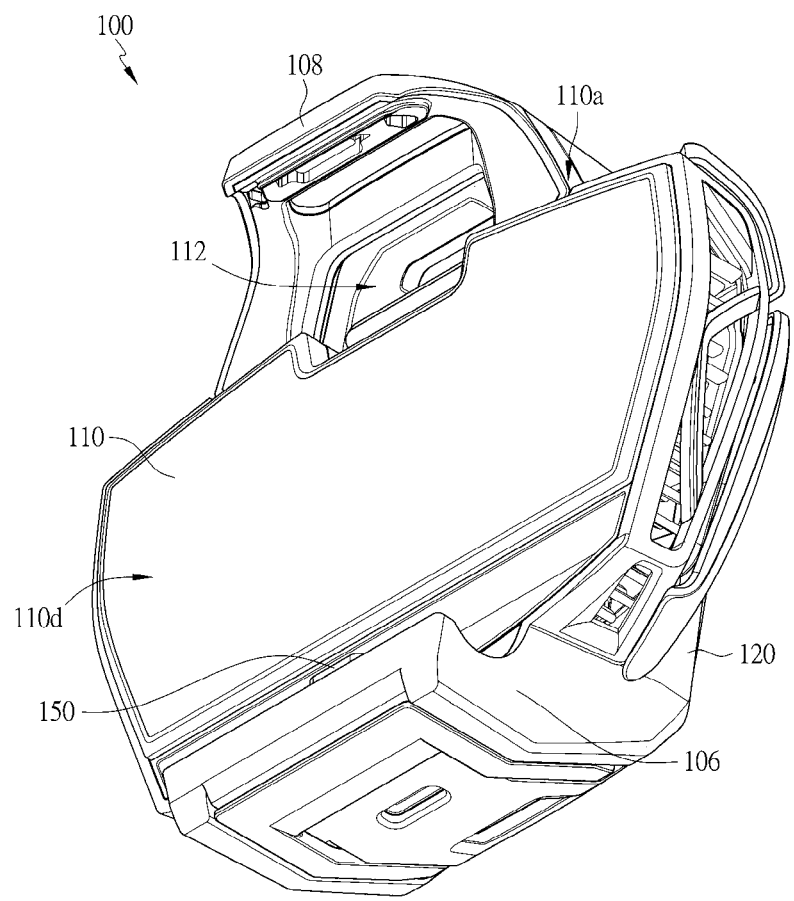
FIG. 2 is a schematic three-dimensional rear view of the heat dissipation holder in FIG. 1.
Figure 3:
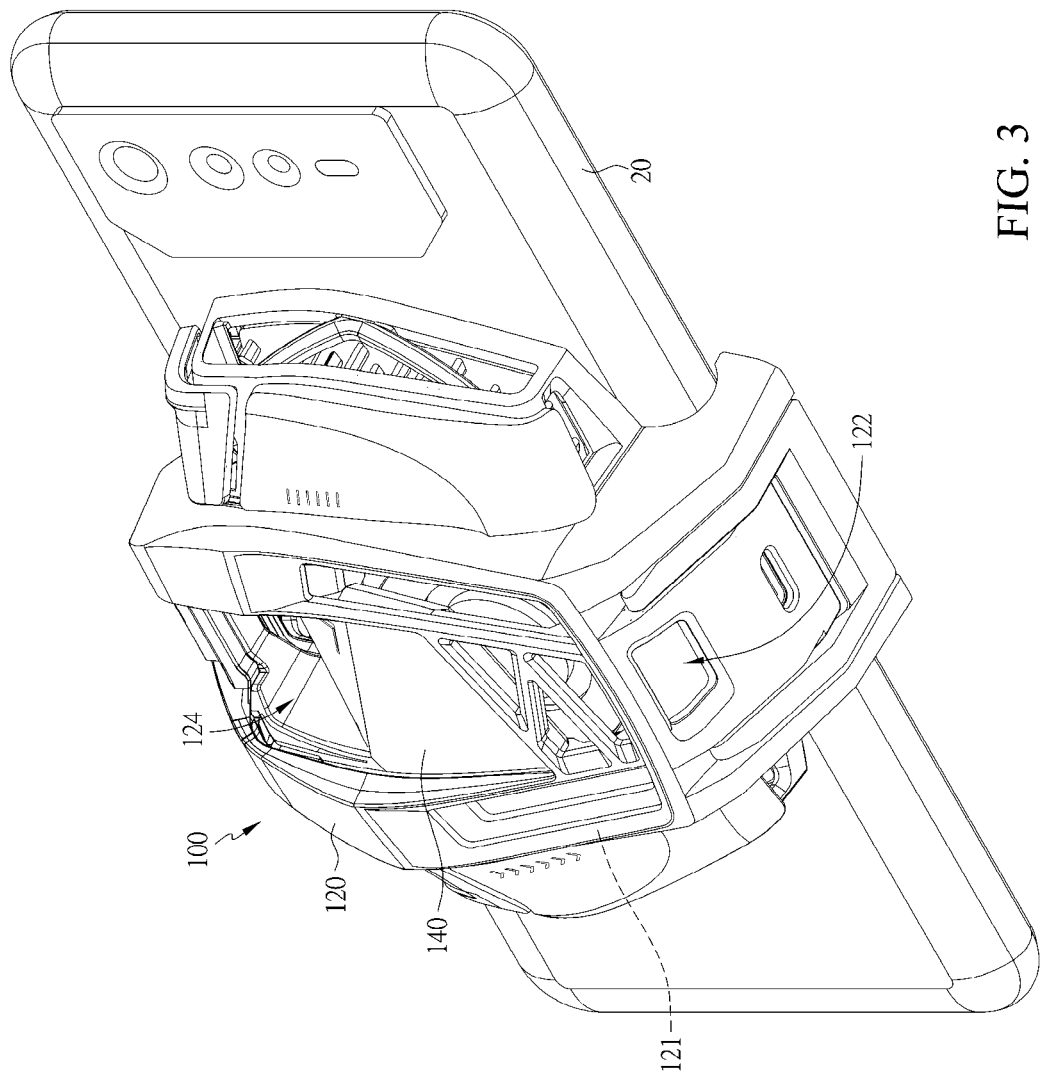
FIG. 3 is a schematic diagram of the heat dissipation holder in FIG. 1 applied to assemble a handheld electronic device.
Figure 4:
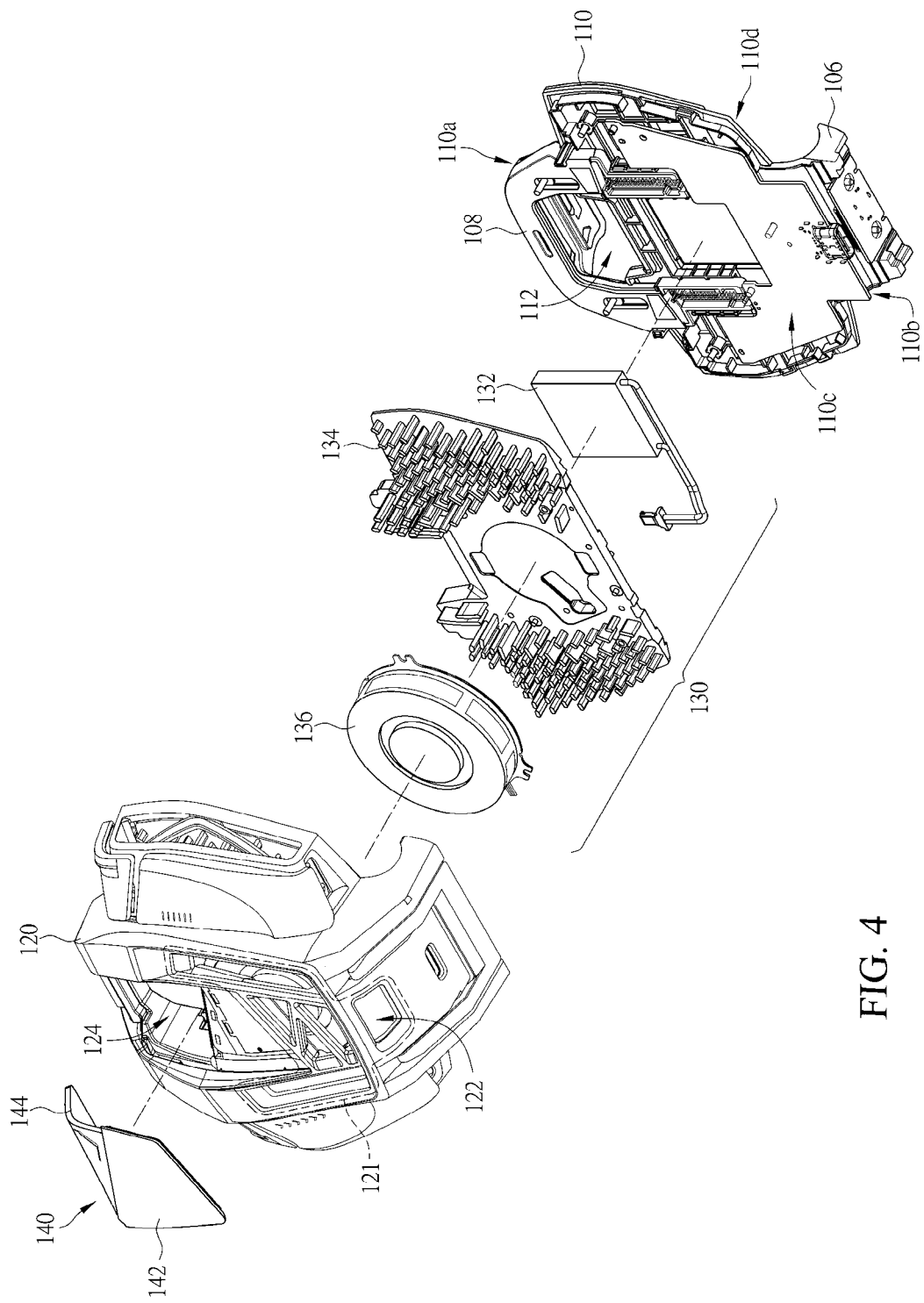
FIG. 4 is a schematic exploded view of the heat dissipation holder in FIG. 1.

Referring to FIG. 3, the disclosure provides a heat dissipation holder 100, applied to assemble a handheld electronic device 20. In an embodiment, the handheld electronic device 20 is a smartphone.

Referring to FIG. 1 to FIG. 4, the heat dissipation holder 100 includes a base 110, a cover 120, a heat dissipation module 130, and an air guiding structure 140.

The base 110 includes a first side 110a and a second side 110b that are opposite to each other and a front surface 110c and a rear surface 110d that are opposite to each other. The second side 110b of the base 110 includes a carrying portion 106. The first side 110a of the base 110 includes a clamping portion 108. The carrying portion 106 and the clamping portion 108 are configured to clamp the handheld electronic device 20, to make the heat dissipation holder 100 assemble to the handheld electronic device 20.

In an embodiment, the heat dissipation holder 100 further includes a port 150. The port 150 is disposed on the carrying portion 106 and is configured to be electrically connected to the handheld electronic device 20. The heat dissipation holder 100 communicates with the handheld electronic device 20 through the port 150, and obtain power from the handheld electronic device 20.

The first side 110a of the base 110 further includes a first opening 112. The cover 120 is combined onto the front surface 110c of the base 110 to form an accommodating space with the base 110, so as to accommodate the heat dissipation module 130. The cover 120 includes an air inlet region 121. The air inlet region 121 is approximately located on a side of the cover corresponding to the second side 110b. A plurality of air inlets (triangular and strip-shaped openings shown in the figure) is provided in the air inlet region 121.

The air inlets include a second opening 122. The second opening 122 is located at a position of the cover 120 corresponding to the second side 110b of the base 110. The air guiding structure 140 is disposed on the cover 120 and extends to the first opening 112. The first opening 112, the air inlet region 121, and the air guiding structure 140 form an airflow channel between the heat dissipation module 130 and the cover 120.

The air guiding structure 140 in this embodiment extends to the first opening 112 to guide airflows to flow to the rear surface of the handheld electronic device 20 for heat dissipation. By changing an extending direction of the air guiding structure 140, in another embodiment, the air guiding structure is also used to guide airflows to another position of the handheld electronic device 20, in an embodiment, the screen or the battery region.

In an embodiment, the first opening 112 is located at a position of the base 110 close to the clamping portion 108. The second opening 122 is located at a position of the cover 120 close to the carrying portion 106. That is to say, the first opening 112 and the second opening 122 are approximately located on an upper side and a lower side of the heat dissipation module 130. In this way, the airflow channel formed by the cover 120 and the air guiding structure 140 effectively guides airflows to flow through the heat dissipation module 130, thereby improving the heat dissipation efficiency.

In an embodiment, as shown in the figure, the center of the cover 120 includes a third opening 124. The third opening 124 runs through the center and is in communication with the first opening 112 of the base 110. The air guiding structure 140 includes a first part 142 and a second part 144. The first part 142 is located in front of a fan 136 and is connected to the cover 120. The second part 144 is located at the third opening 124 and extends from the first part 142 to the first opening 112, to guide airflows to flow out of the heat dissipation holder 100 toward a direction of the first opening 112.

The heat dissipation module 130 includes a thermoelectric cooler 132, a heat sink 134, and a fan 136. The thermoelectric cooler 132 is disposed on the base 110. The thermoelectric cooler 132 comes into contact with the handheld electronic device 20 through a heat conduction structure (not shown in the figure) to dissipate heat from the handheld electronic device 20 in a heat conduction mode.

The heat sink 134 and the fan 136 are stacked in order on a side of the thermoelectric cooler 132 facing the cover 120. The heat sink 134 is disposed on the thermoelectric cooler 132 to increase a heat dissipation area. The fan 136 is disposed on the heat sink 134 and is configured to generate airflows for taking away heat on the heat sink 134.

Figure 5:
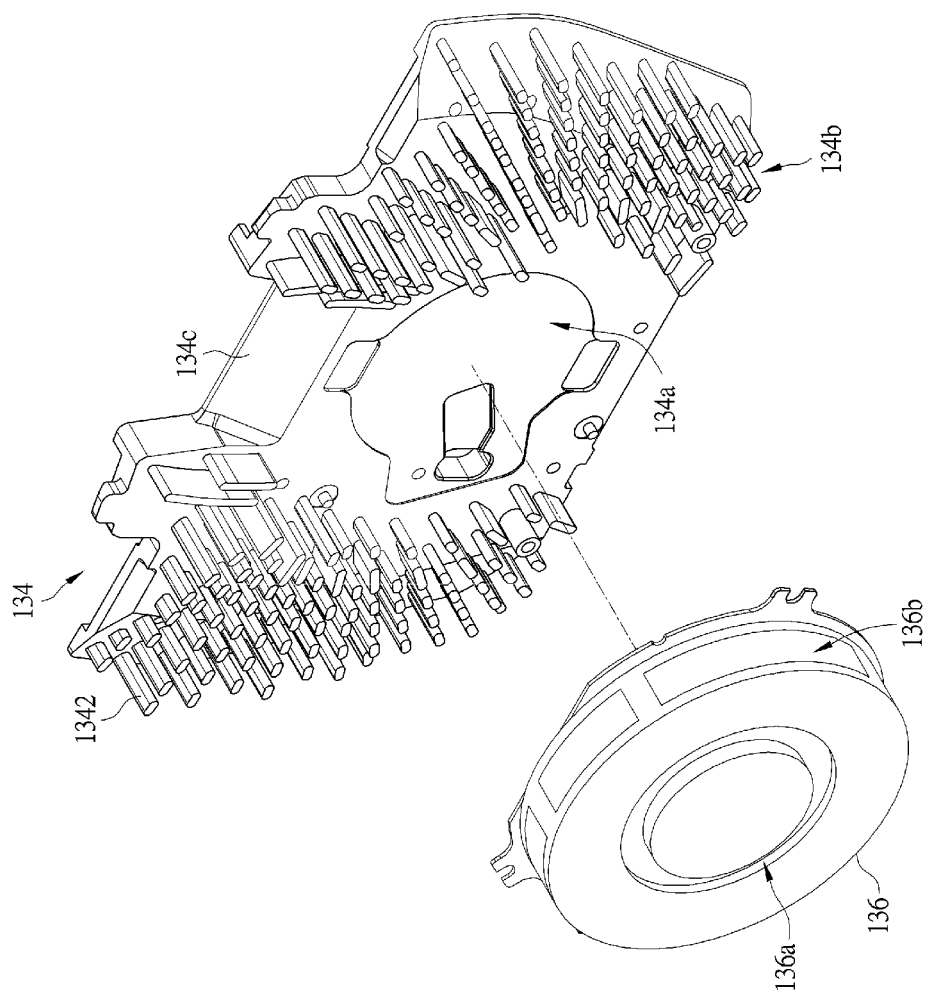
FIG. 5 is a schematic three-dimensional diagram of a heat sink and a fan in FIG. 4 from another perspective.

Referring to FIG. 5, the heat sink 134 includes a central part 134a and a fin part 134b. The central part 134a of the heat sink 134 presents a planar structure and is configured to assemble the fan 136. The fin part 134b is located at a periphery of the central part 134a and includes a plurality of cooling fins 1342. Fins of the fin part 134b are disposed to extend outward in a horizontal direction, thereby reducing the overall thickness of the heat dissipation module 130 with a thin architecture while maintaining the overall heat dissipation area of the heat sink 134.

In an embodiment, the cooling fins 1342 are disposed radially outward from the central part 134a, to form an outward extending air duct to guide airflows to flow, thereby improving the heat dissipation efficiency.

The fan 136 is a centrifugal fan with a flat structure, which is beneficial to further reducing the overall thickness of the heat dissipation holder 100. The fan 136 includes an air inlet 136a and an air outlet 136b. The air inlet 136a is located on a side of the fan 136 facing away the heat sink 134. The air outlet 136b is located on a side of the fan 136 and faces the fin part 134b.

In an embodiment, the heat sink 134 includes an oblique surface 134c at a position corresponding to the first opening 112. The oblique surface 134c extends to the central part 134a of the heat sink 134, which is beneficial to guiding airflows generated by the fan 136 to flow out of the heat dissipation holder 100 toward a direction of the first opening 112.

Figure 6:
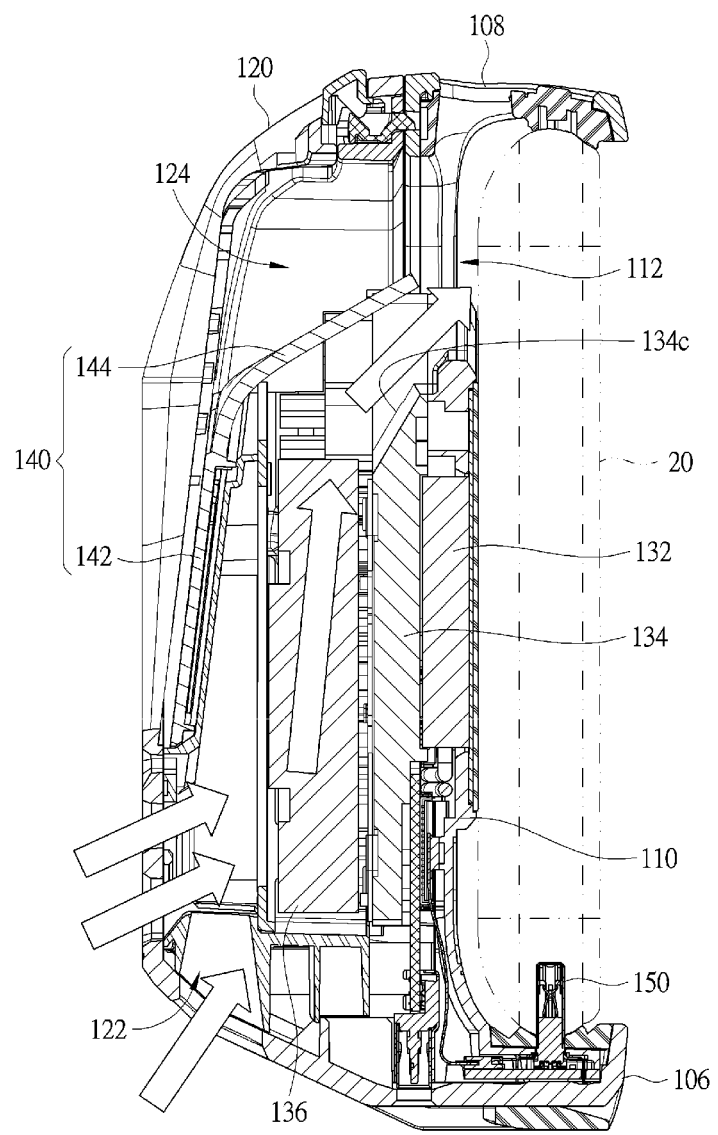
FIG. 6 is a schematic cross-sectional view of the heat dissipation holder in FIG. 1.

Referring to FIG. 6, an arrow in the figure shows an airflow direction. When the fan 136 operates, airflows enter the air inlet 136a of the fan 136 from the second opening 122 of the cover 120, and then flow out of the heat dissipation holder 100 from the air outlet 136b on a side of the fan 136 under guidance of the air guiding structure 140 toward a direction of the first opening 112. Because the first opening 112 faces the rear surface of the handheld electronic device 20 directly, airflows generated by the fan 136 during operation further help reduce a surface temperature of the handheld electronic device 20.

Figure 7:
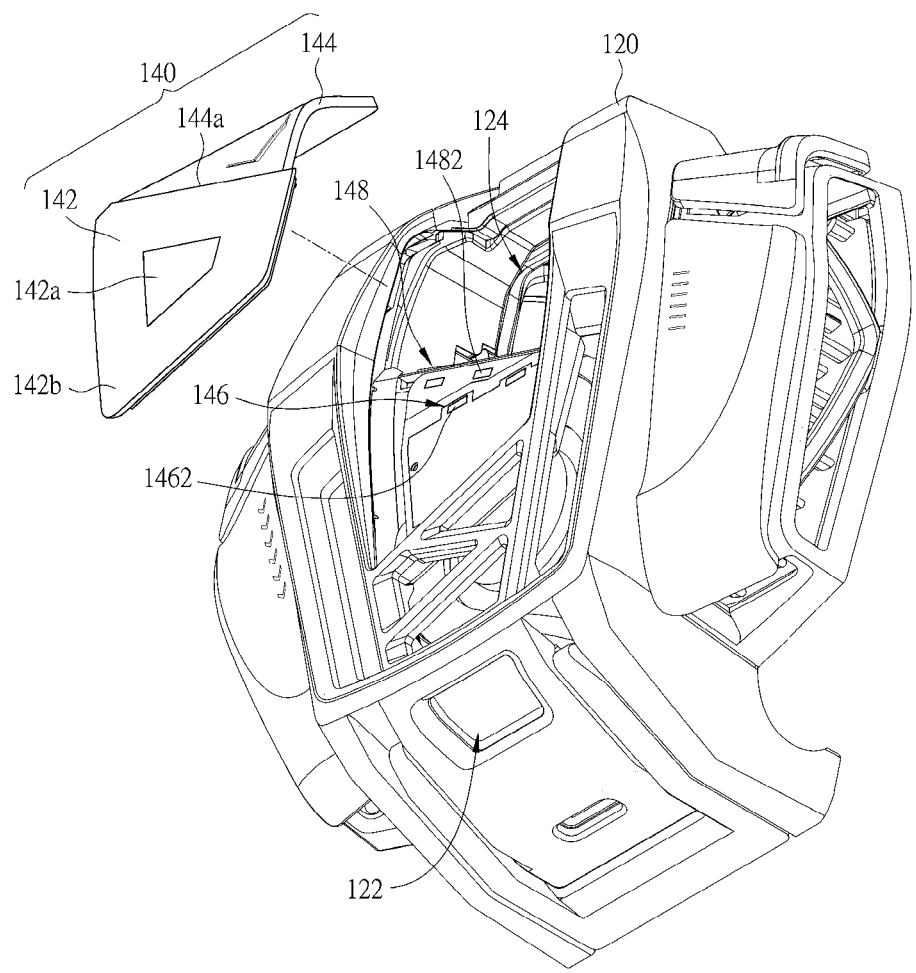
FIG. 7 is an enlarged diagram of a cover and an air guiding structure in FIG. 4.

Referring to FIG. 7, in an embodiment, the cover 120 further includes a first light-emitting unit 146 and a second light-emitting unit 148. The first light-emitting unit 146 is located on an inner side of the first part 142 of the air guiding structure 140. The first light-emitting unit 146 emits light toward the first part 142. In an embodiment, the first part 142 of the air guiding structure 140 includes a translucent region 142a and an opaque region 142b. The translucent region 142a presents a sign. In an embodiment, the first light-emitting unit 146 includes at least one light emitting diode chip 1462 (two light emitting diode chips shown in the figure).

The second light-emitting unit 148 is located on an inner side of the air guiding structure 140 and is close to a side 144a of the second part 144 of the air guiding structure 140. The second light-emitting unit 148 emits light toward the side 144a of the second part 144.

In an embodiment, the second part 144 is a translucent structure. The second light-emitting unit 148 causes the second part 144 to present a special light emitting effect. In an embodiment, the second light-emitting unit 148 includes at least one light emitting diode chip 1482 (two light emitting diode chips shown in the figure).

Airflows are effectively guided by the air guiding structure 140, the first opening 112 on the base 110, and the second opening 122 on the cover 120 provided in the disclosure to flow through the heat dissipation module 130 for heat dissipation, and flow through the heating region on the rear surface of the handheld electronic device 20, to improve the efficiency of dissipating the heat of the handheld electronic device 20. Next, the air guiding structure 140 provided in the disclosure further includes a first part 142 and a second part 144, combined with the first light-emitting unit 146 and the second light-emitting unit 148 to provide special light emitting effects.

In addition, because the heat sink 134 provided in the disclosure includes a central part 134a with a relatively small thickness and a radial fin part 134b surrounding the central part 134a, the fan 136 is disposed on the central part 134a, thereby not only effectively guiding airflows to flow, so as to remove the heat generated by the thermoelectric cooler 132, but also helping reduce the overall thickness of the heat dissipation holder 100.

The above are only exemplary embodiments of the disclosure and are not intended to limit the disclosure in any way. Variations such as equivalent replacements or modifications in any form made by any person skilled in the art to the technical means and technical contents disclosed in the disclosure without departing from the technical means of the disclosure are contents not departing from the technical means of the disclosure and still fall within the protection scope of the disclosure.

What is claimed is:

1. A heat dissipation holder, applied to a handheld electronic device, the heat dissipation holder comprising:
   a base, comprising a first side and a second side that are opposite to each other and a front surface and a rear surface that are opposite to each other, wherein the first side comprises a first opening;
   a cover, combined onto the front surface to form an accommodating space with the base, wherein the cover comprises an air inlet region;

a heat dissipation module, disposed in the accommodating space; and an air guiding structure, disposed on the cover and extending to the first opening, wherein wherein the first opening, the air inlet region, and the air guiding structure form an airflow channel between the heat dissipation module and the cover, and wherein the cover comprises a second opening, the air guiding structure is disposed in the second opening, the cover is made of an opaque material, and at least a part of the air guiding structure is made of a translucent material.

2. The heat dissipation holder according to claim 1, wherein the air inlet region comprises a third opening, and the third opening is located at a position of the cover corresponding to the second side.

3. The heat dissipation holder according to claim 1, wherein the heat dissipation module comprises a thermoelectric cooler, a heat sink, and a fan, the thermoelectric cooler is disposed on the base, and the heat sink and the fan are stacked in order on a side of the thermoelectric cooler facing the cover.

4. The heat dissipation holder according to claim 3, wherein the heat sink comprises a central part and a fin part, the fin part is located at a periphery of the central part, and the fan is disposed on the central part.

5. The heat dissipation holder according to claim 4, wherein the fan comprises an air inlet and an air outlet, the air inlet faces the air guiding structure, and the air outlet faces the fin part.

6. The heat dissipation holder according to claim 3, wherein the air guiding structure comprises a first part and a second part, the first part is disposed in front of the fan, and the second part extends from the first part to the first opening.

7. The heat dissipation holder according to claim 6, further comprising a first light-emitting unit, disposed on an inner side of the first part, wherein the first light-emitting unit emits light toward the first part.

8. The heat dissipation holder according to claim 6, further comprising a second light-emitting unit disposed on the first part close to a side of the second part, wherein the second light-emitting unit emits light toward the side.

9. The heat dissipation holder according to claim 6, wherein the first part is an opaque structure, and the second part is a translucent structure.

10. The heat dissipation holder according to claim 1, further comprising a carrying portion and a clamping portion, wherein the carrying portion is disposed on the second side, and the clamping portion is disposed on the first side, and the carrying portion and the clamping portion are used to clamp the handheld electronic device to make the heat dissipation holder assemble to the handheld electronic device.

* * * * *